(12) United States Patent
Shankar et al.

(10) Patent No.: US 6,351,760 B1
(45) Date of Patent: Feb. 26, 2002

(54) DIVISION UNIT IN A PROCESSOR USING A PIECE-WISE QUADRATIC APPROXIMATION TECHNIQUE

(75) Inventors: Ravi Shankar, Sunnyvale; Subramania I. Sudharsanan, Union City, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/240,312

(22) Filed: Jan. 29, 1999

(51) Int. Cl.[7] .................................................. G06F 7/52
(52) U.S. Cl. ........................................ 708/654; 708/504
(58) Field of Search ................................. 708/654, 504

(56) References Cited

U.S. PATENT DOCUMENTS

| | | | |
|---|---|---|---|
| 4,336,599 A | 6/1982 | Wong | 364/752 |
| 4,477,879 A | 10/1984 | Wong | 364/752 |
| 4,682,302 A | 7/1987 | Williams | 364/768 |
| 4,734,876 A | 3/1988 | Williams | 364/715 |
| 4,737,925 A | 4/1988 | Williams | 364/768 |
| 4,748,518 A | 5/1988 | Suzuki | 358/312 |
| 4,757,467 A | 7/1988 | Dieterich et al. | 364/752 |
| 4,823,301 A * | 4/1989 | Knierim | 708/654 |
| 4,852,038 A | 7/1989 | Wagner et al. | 364/748.5 |
| 4,857,882 A | 8/1989 | Wagner et al. | 340/146.2 |
| 4,949,296 A | 8/1990 | Malinowski | 364/752 |
| 4,991,132 A * | 2/1991 | Kadota | 708/654 |
| 5,097,434 A | 3/1992 | Stouraitis | 364/746.2 |
| 5,184,317 A | 2/1993 | Pickett | 364/735 |
| 5,245,564 A * | 9/1993 | Quek et al. | 708/625 |
| 5,268,857 A | 12/1993 | Chen et al. | 364/752 |
| 5,280,439 A | 1/1994 | Quek et al. | 364/760 |
| 5,305,248 A | 4/1994 | Ammann | 364/748 |
| 5,337,266 A | 8/1994 | Arnold | 364/748.5 |
| 5,359,551 A | 10/1994 | Pickett | 364/718 |
| 5,537,345 A | 7/1996 | Nakano | 364/752 |
| 5,563,818 A | 10/1996 | Agarwal et al. | 364/748 |
| 5,600,581 A | 2/1997 | Dworkin et al. | 364/722 |
| 5,633,818 A | 5/1997 | Taniguchi | 364/745 |
| 5,675,822 A | 10/1997 | Kelley | 395/800 |
| 5,729,481 A | 3/1998 | Schwarz | 364/745 |
| 5,737,255 A | 4/1998 | Schwarz | 364/745 |
| 5,737,257 A | 4/1998 | Chen et al. | 364/754.1 |
| 5,751,619 A | 5/1998 | Agarwal et al. | 364/736.02 |
| 5,764,555 A | 6/1998 | McPherson et al. | 364/748.03 |
| 5,764,990 A | 6/1998 | Sullivan | 395/705 |
| 5,768,170 A | 6/1998 | Smith | 364/748.1 |
| 6,115,733 A * | 9/2000 | Oberman et al. | 708/654 |

OTHER PUBLICATIONS

Lecture Notes in Control and Information Sciences, 38, System Modeling and Optimization, Springer–Verlag, NY, 1982, pp. 276–283, Tsai et al: 'A Robustized Maximum Entropy Approach to System Identification' XP000920525.

* cited by examiner

Primary Examiner—David H. Malzahn
(74) Attorney, Agent, or Firm—Skjerven Morrill MacPherson LLP; Ken J. Koestner

(57) ABSTRACT

A computation unit computes a division operation Y/X by determining the value of a divisor reciprocal 1/X and multiplying the reciprocal by a numerator Y. The reciprocal 1/X value is determined using a quadratic approximation having a form:

$$Ax^2+Bx+C,$$

where coefficients A, B, and C are constants that are stored in a storage or memory such as a read-only memory (ROM). The bit length of the coefficients determines the error in a final result. Storage size is reduced through use of "least mean square error"techniques in the determination of the coefficients that are stored in the coefficient storage. During the generation of partial products $x^2$, $Ax^2$, and $Bx$, the process of rounding is eliminated, thereby reducing the computational logic to implement the division functionality.

20 Claims, 10 Drawing Sheets

Plot of 1/X and X

Flow of Data for the Floating Point Division

| Cycle | ROM | 16X16 Multiplier | 28X24 Multiplier | 28 bit Adder | Incrementer | Description |
|---|---|---|---|---|---|---|
| 1 | Look Up A, B & C | x*x(B) | | | | Calculate $x^2$. Look Up A, B & C |
| 2 | | $Ax^2$(B) | Bx(CS) | | | |
| 3 | | | | $1/X = Ax^2+Bx+C$ | | Approx. 1/X |
| 4 | | | $Q^1=1/X*Y$ (CS) | | | Pre-Rounded Value ($Q^1$.) |
| 5 | | | $Q^{11}$*X(CS) | $Q^1$(CS) --> $Q^1$(B) | $Q^2=Q^1+1$ | Rounding; Pre-calculate the value of $Q^1+1$ |
| 6 | | | | $(Q^{11}*X)-Y$ | | Based on the result of $(Q^{11}*X)-Y$. Select appropriate result (i.e) $Q^1$ or $Q^2$ |

FIG. 5

Different cases for rounding to nearest even scheme.

| Number (x) | $Q^1$ | $Q^{11}$ | $Q^{11}-x$ | Rounded (x) | Error |
|---|---|---|---|---|---|
| X0.00 | X0. | X0.1 | +ve | X0 | 0 |
| X0.01 | X0. | X0.1 | +ve | X0 | -1/4 |
| X0.10 | X0. | X0.1 | 0 | X0 | -1/2 |
| X0.11 | X1. | X1.1 | -ve | X0+1 | +1/4 |
| X1.00 | X1. | X1.1 | +ve | X1 | 0 |
| X1.01 | X1. | X1.1 | +ve | X1 | -1/4 |
| X1.10 | X1. | X1.1 | 0 | X1+1 | +1/2 |
| X1.11 | X1. | X1.1 | -ve | X1+1 | +1/4 |

FIG. 6

DIVISION UNIT IN A PROCESSOR USING A PIECE-WISE QUADRATIC APPROXIMATION TECHNIQUE

CROSS-REFERENCE

The present invention is related to subject matter disclosed in the following co-pending patent applications:

1. U.S. patent application Ser. No. 09/240,765 entitled, "Square Root and Reciprocal Square Root Computation Unit in a Processor", naming Ravi Shankar and Subramania Sudharsanan as inventors and filed on even date herewith;
2. U.S. patent application Ser. No. 09/240,977 entitled, "Speed and Area-Efficient Division and Multiplication Unit in a Processor", naming Ravi Shankar and Subramania Sudharsanan as inventors and filed on even date herewith.

BACKGROUND OF THE INVENTION

1. Field of the Invention

The present invention relates to computational and calculation functional units of computers, controllers and processors. More specifically, the present invention relates to functional units that perform division operations.

2. Description of the Related Art

Computer systems have evolved into versatile systems with a vast range of utility including demanding applications such as multimedia, network communications of a large data bandwidth, signal processing, and the like. Accordingly, general-purpose computers are called upon to rapidly handle large volumes of data. Much of the data handling, particularly for video playback, voice recognition, speech process, three-dimensional graphics, and the like, involves computations that must be executed quickly and with a short latency.

One technique for executing computations rapidly while handling the large data volumes is to include multiple computation paths in a processor. Each of the data paths includes hardware for performing computations so that multiple computations may be performed in parallel. However, including multiple computation units greatly increases the size of the integrated circuits implementing the processor. What are needed in a computation functional unit are computation techniques and computation integrated circuits that operate with high speed while consuming only a small amount of integrated circuit area.

Execution time in processors and computers is naturally enhanced through high speed data computations, therefore the computer industry constantly strives to improve the speed efficiency of mathematical function processing execution units. Computational operations are typically performed through iterative processing techniques, look-up of information in large-capacity tables, or a combination of table accesses and iterative processing. In conventional systems, a mathematical function of one or more variables is executed by using a part of a value relating to a particular variable as an address to retrieve either an initial value of a function or a numeric value used in the computation from a large-capacity table information storage unit. A high-speed computation is executed by operations using the retrieved value. Table look-up techniques advantageously increase the execution speed of computational functional units. However, the increase in speed gained through table accessing is achieved at the expense of a large consumption of integrated circuit area and power.

A division instruction is highly burdensome and difficult to implement in silicon, typically utilizing many clock cycles and consuming a large integrated circuit area.

What is needed is a method for implementing division in a computing circuit that is simple, fast, and reduces the amount of computation circuitry.

SUMMARY OF THE INVENTION

A computation unit computes a division operation Y/X by determining the value of a divisor reciprocal 1/X and multiplying the reciprocal by a numerator Y. The reciprocal 1/X value is determined using a quadratic approximation having a form:

$$Ax^2+Bx+C,$$

where coefficients A, B, and C are constants that are stored in a storage or memory such as a read-only memory (ROM). The bit length of the coefficients determines the error in a final result. Storage size is reduced through use of "least mean square error" techniques in the determination of the coefficients that are stored in the coefficient storage. During the generation of partial products $x^2$, $Ax^2$, and Bx, the process of rounding is eliminated, thereby reducing the computational logic to implement the division functionality.

A method of computing a floating point division operation uses a piece-wise quadratic approximation to determine a value 1/X where X is a floating point number having a numerical format including a sign bit, an exponent field, and a mantissa field. A floating point division Y/X is executed by computing the value 1/X and multiplying the result by a value Y. The value 1/X is computed in a computing device using a piece-wise quadratic approximation in the form:

$$1/X=Ax^2+Bx+C.$$

The value x is defined as a plurality of lower order bits of the mantissa. Coefficients A, B, and C are derived for the division operation to reduce the least mean square error using a least squares approximation of a plurality of equally-spaced points within an interval. In one embodiment, an interval includes 256 equally-spaced points. The coefficients are stored in a storage and accessed during execution of the division computation instruction.

In some embodiments, a lookup table in storage is indexed using the leading or higher order bits of the mantissa. Since the most significant bit of the mantissa is always 1, some embodiments use a plurality of higher order bits but not including the most significant bit to index into the lookup table storage.

The method produces a "pre-rounded" Y/X result that is rounded to the nearest value. The pre-rounded result is truncated at a round bit position and incremented at the round bit position to generate an incremented quotient that is within one LSB of a correct solution. The incremented quotient multiplied by the divisor is compared with the dividend by subtraction. If the remainder is negative, then the pre-rounded result is more than half an LSB below the correct value and is incremented. If the remainder is positive, then the prerounded result is less than half an LSB below the correct value and is not incremented. If the remainder is zero, the result is selected based on the LSB of the pre-rounded result.

BRIEF DESCRIPTION OF THE DRAWINGS

The features of the described embodiments are specifically set forth in the appended claims. However, embodiments of the invention relating to both structure and method of operation, may best be understood by referring to the following description and accompanying drawings.

FIG. 5 is a table showing a data flow for the floating point division operation.

FIG. 6 is a table showing different cases for rounding to the nearest even scheme.

The use of the same reference symbols in different drawings indicates similar or identical items.

DESCRIPTION OF THE EMBODIMENT(S)

Figure 1A:
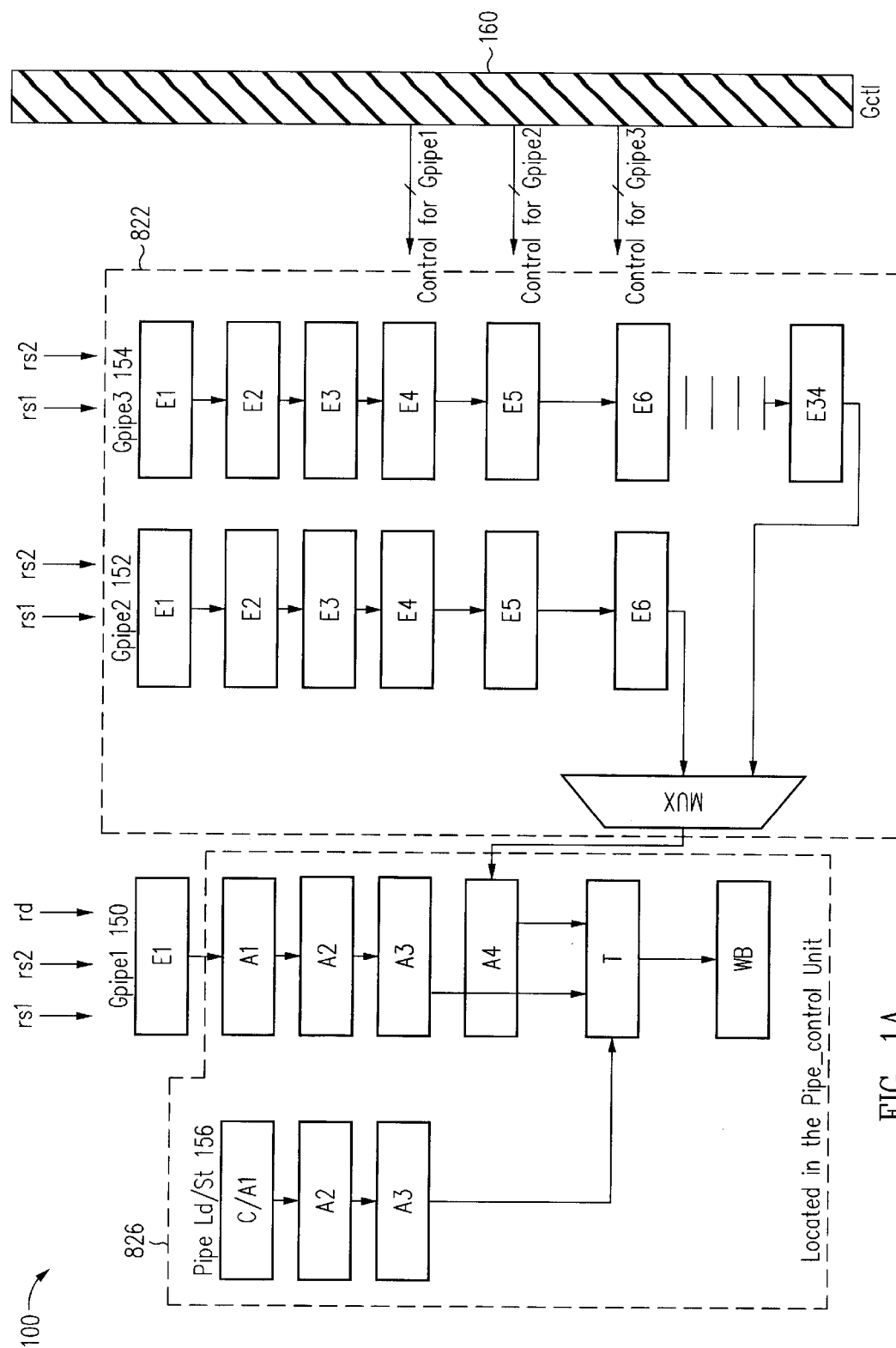
FIGS. 1A and 1B are respectively a schematic block diagram showing an embodiment of a general functional unit and a simplified schematic timing diagram showing timing of a general functional unit pipeline.
Figure 1B:
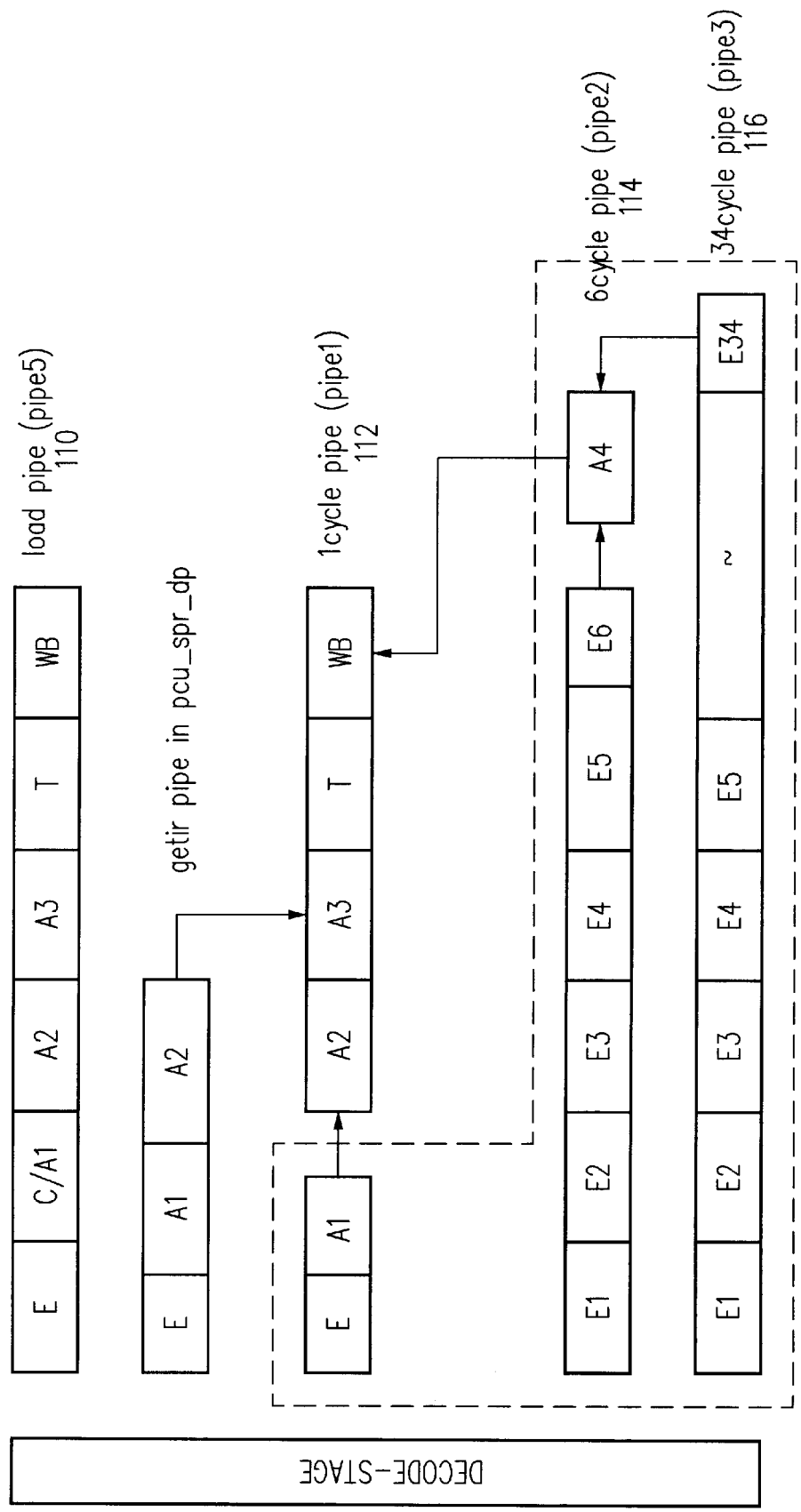

Referring to FIGS. 1A and 1B respectively, a schematic block diagram shows an embodiment of a general functional unit 822 (illustrated more generally as part of a processor in FIG. 8), a simplified schematic timing diagram illustrating timing of general functional unit pipelines 100, and a bypass diagram showing possible bypasses for the general functional unit 822. The general functional unit 822 supports instructions that execute in several different pipelines. Instructions include single-cycle ALU operations, four-cycle getir instructions, and five-cycle setir instructions. Long-latency instructions are not fully pipelined. The general functional unit 822 supports six-cycle and 34-cycle long operations and includes a dedicated pipeline for load/store operations.

The general functional unit 822 and a pipeline control unit 826 (also shown generally in FIG. 8), in combination, include four pipelines, Gpipe1 50, Gpipe2 152, Gpipe3 154, and a load/store pipeline 156. The load/store pipeline 156 and the Gpipe1 150 are included in the pipeline control unit 826. The Gpipe2 152 and Gpipe3 154 are located in the general functional unit 822. The general functional unit 822 includes a controller 160 that supplies control signals for the pipelines Gpipe1 150, Gpipe2 152, and Gpipe3 154. The pipelines include execution stages (En) and annex stages (An).

Referring to FIG. 1B, the general functional unit pipelines 100 include a load pipeline 110, a 1-cycle pipeline 112, a 6-cycle pipeline 114, and a 34-cycle pipeline 116. Pipeline stages include execution stages (E and En), annex stages (An), trap-handling stages (T), and write-back stages (WB). Stages An and En are prioritized with smaller priority numbers n having a higher priority.

The processor 700 supports precise traps. Precise exceptions are detected by E4/A3 stages of media functional unit and general functional unit operations. One-cycle operations are stages in annex and trap stages (A1, A2, A3, T) until all exceptions in one VLIW group are detected. Traps are generated in the trapgenerating stages (T). When the general functional unit 822 detects a trap in a VLIW group, all instructions in the VLIW group are canceled.

When a long-latency operation is in the final execute stage (E6 stage for the 6-cycle pipeline 114 or E34 stage for the 34-cycle pipeline 116), and a valid instruction is under execution in the A3-stage of the annex, then the long-latency instruction is held in a register, called an A4-stage register, inside the annex and is broadcast to the register file segments 824 only when the VLIW group under execution does not include a one-cycle GFU instruction that is to be broadcast.

Results of long-latency instructions are bypassed to more recently issued GFU and MFU instructions as soon as the results are available. For example, results of a long-latency instruction are bypassed from the E6-stage of a 6-cycle instruction to any GFU and MFU instruction in the decoding (D) stage. If a long-latency instruction is stalled by another instruction in the VLIW group, results of the stalled long-latency instruction are bypassed from the annex (A4) stage to all instructions in the general functional unit 822 and all media functional units 220 in the decoding (D) stage.

Data from the T-stage of the pipelines are broadcast to all the register file segments 824, which latch the data in the writeback (WB) stage before writing the data to the storage cells.

Figure 2:
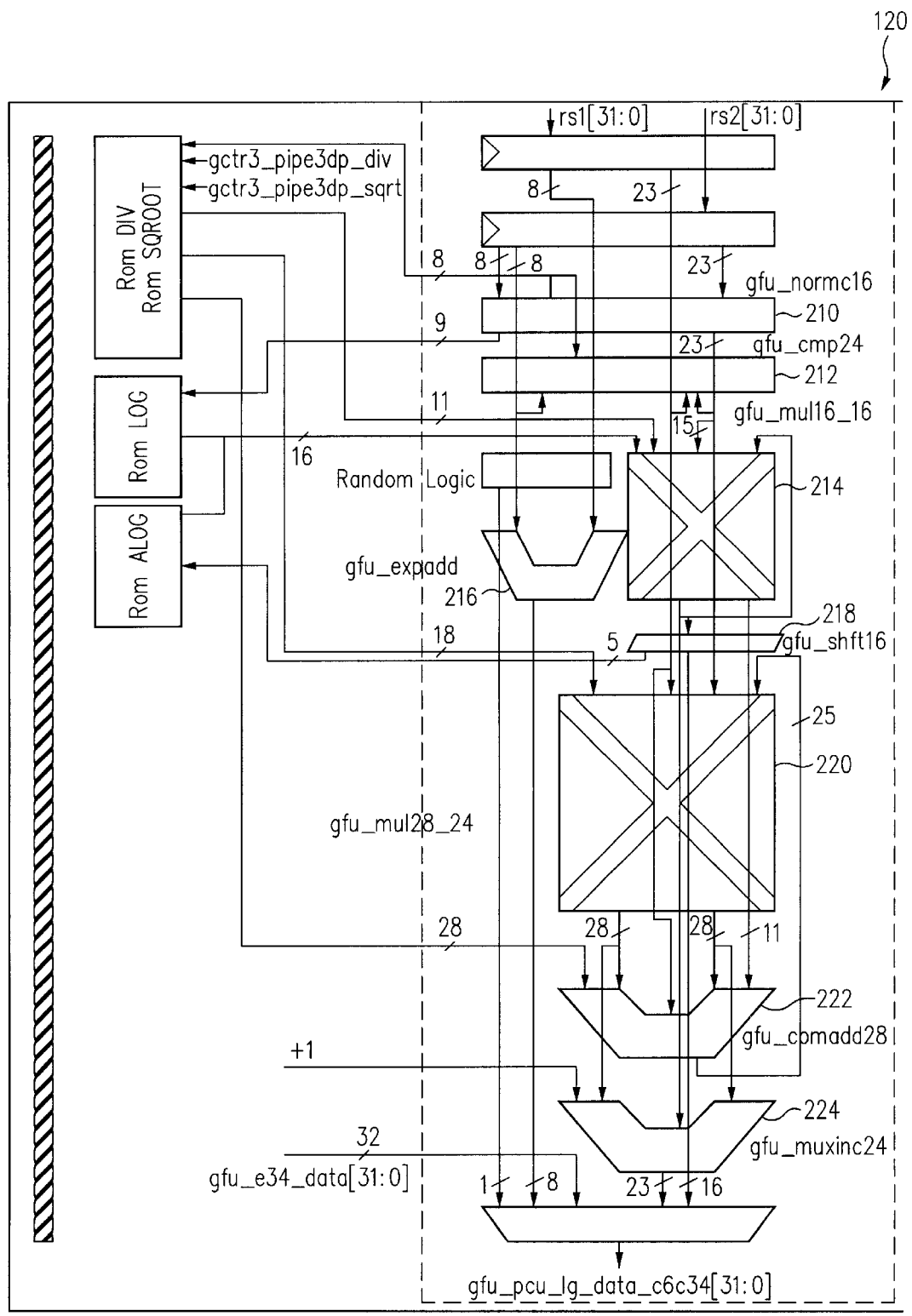
FIG. 2 is a schematic block diagram that illustrates an embodiment of a long-latency pipeline used in the general functional unit.

Referring to FIG. 2, a schematic block diagram illustrates an embodiment of a long-latency pipeline 120 used in the general functional unit (GFU) 822. The long-latency pipeline 120 executes six-cycle instructions. In the illustrative embodiment, the six-cycle instructions include a single-precision floating point division (fdiv) instruction, a single-precision floating point reciprocal square root (frecsqrt) instruction, a fixed-point power computation (ppower) instruction, and a fixed-point reciprocal square root (precsqrt) instruction.

The single-precision floating point division (fdiv) instruction has the form:

fdiv rs1, rs2, rd where rs1 and rs2 designate a numerator source operand and a denominator source operand, respectively. The rd operand designates a destination register for holding the result.

The single-precision floating point reciprocal square root (frecsqrt) instruction has the form:

frecsqrt rs1, rd where rs1 designates a source operand and the rd operand identifies the destination register that holds the reciprocal square root result.

The fixed-point power computation (ppower) instruction has the form:

ppower rs1, rs2, rd where rs1 and rs2 designate source operands and rd identifies a destination register operand. The ppower instruction computes rs1**rs2 for each half of the source registers.

The fixed-point reciprocal square root (precsqrt) instruction has the form:

precsqrt rs1, rd where rs1 designates a source operand and the rd operand identifies the destination register that holds the reciprocal square root result. The precsqrt instruction computes the reciprocal square root for each half of rs1.

The illustrative long-latency pipeline 120 has eight megacell circuits including a 16-bit normalization megacell 210, a 24-bit compare megacell 212, a 16-bit by 16-bit multiplier megacell 214, an exponent add megacell 216, a 16-bit barrel shifter megacell 218, a 25-by-24 multiplier megacell 220, and a compressor and adder megacell 222, and a multiplexer and incrementer megacell 224.

The 16-bit normalization megacell 210 contains a leading zero detector and a shifter that shifts a sixteen bit value according to the status of the leading zero detection. The 16-bit normalization megacell 210 also includes two 4-bit registers that store the shift count values.

The 24-bit compare megacell 212 compares two 24-bit mantissa values. The 24-bit compare megacell 212 generates only equal and less-than signals.

The 16-bit by 16-bit multiplier megacell 214 multiplies two 16-bit values. The actual datapath of the 16-bit by 16-bit multiplier megacell 214 is 18 bit cells wide and includes eight 18-bit rows. The 16-bit by 16-bit multiplier megacell 214 is a radix 4 booth recoder multiplier that generates an output signal in the form of a 32-bit product in binary form. The booth recoders in the 16-bit by 16-bit multiplier megacell 214 are recoded from the binary format in contrast to a carry-save format.

The exponent add megacell 216 subtracts the exponent for a floating point divide operation. The exponent add megacell 216 also performs shifting for execution of a square root operation.

The 16-bit barrel shifter megacell 218 is a 16-bit barrel shifter. The 16-bit barrel shifter megacell 218 is a subset of a 32-bit shifter.

The 25-by-24 multiplier megacell 220 is a 25-bit by 24-bit multiplier. The 25-by-24 multiplier megacell 220 has an actual datapath of 27 bit cells with twelve rows of the 27 bit cells. The 25-by-24 multiplier megacell 220 is a radix 4 booth recoded multiplier that generates an output signal in the form of a 28-bit product in a carry-save format. The booth recoders are recoded from the carry-save format in contrast to a binary format.

The compressor and adder megacell 222 includes a 4:2 compressor followed by a 28-bit adder. The 28-bit adder uses a kogge-stone algorithm with lings modification.

The multiplexer and incrementer megacell 224 produces two 24-bit products, a sum of two 28-bit numbers in the carry-save format and the increment of the sum. The final multiplexer selects a correct answer based on the sign of the result from the compressor and adder megacell 222. The adder of the multiplexer and incrementer megacell 224 uses conditional sum adders.

Figure 3:
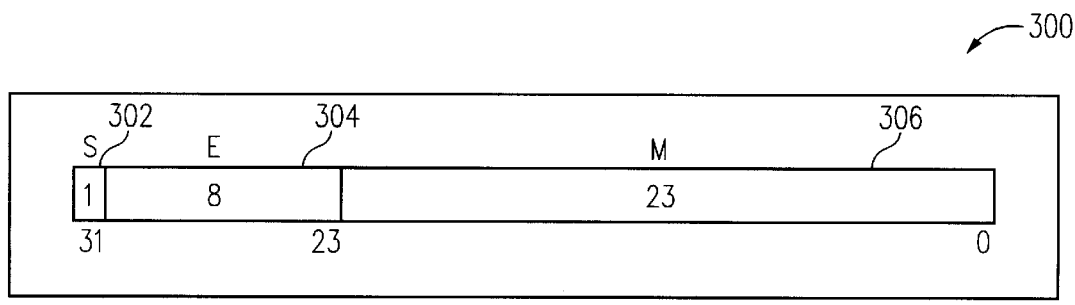
FIG. 3 is a graphic shows the format of a single-precision floating point number.

Referring to FIG. 3, a graphic shows the format of a single-precision floating point number 300. The single-precision floating point format 300 has three fields including one bit for the sign 302, eight bits for the exponent 304, and 23 bits for the mantissa 306. The sign bit 302 equal to zero designates a positive number. The sign bit 302 equal to one designates a negative number. The value of the exponent 304 ranges from 0 to 255. The bias of the exponent 304 is +127. Of the 256 values in the range 0 to 255, only the values of 0 and 255 are reserved for special values. The maximum positive exponent is +127. The minimum negative exponent is −126. The lower order 23 bits designate the mantissa 306, which is an unsigned fractional number. An implicit value of 1 is included prior to the unsigned fraction. The range of values of the mantissa 306 is from 1.0 to $(2-2^{-23})$. The mantissa range is defined only for normal numbers.

The value of a floating point number is given by the equation, as follows:

$$F=(-1)^s 1 \cdot M(2^{E-127})$$

For the sign bit 302 (S), the mantissa 306 (M), and the exponent 304 (E).

Several special cases are represented differently than the equation in which the floating point number format is otherwise represented as follows:

(1) If the exponent 304 is 255 and the mantissa 306 is zero then the floating point number represents +/− infinity where the sign of infinity is defined by the sign bit 302.

(2) If the exponent 304 is equal to 255 and M is not equal to zero, then the floating point number is defined as not-a-number (NaN).

(3) If the exponent 304 is equal to zero and the mantissa 306 is equal to zero then the floating point number represents +/−0. The sign of zero is defined by the sign bit 302.

(4) If the exponent 304 is equal to zero and the mantissa 306 is not equal to zero, then the floating point number represents a denormal number. The value of the denormal number is given by the equation, as follows:

$$F=(-1)^s 0 \cdot M(2^{E-126})$$

Figure 4A:
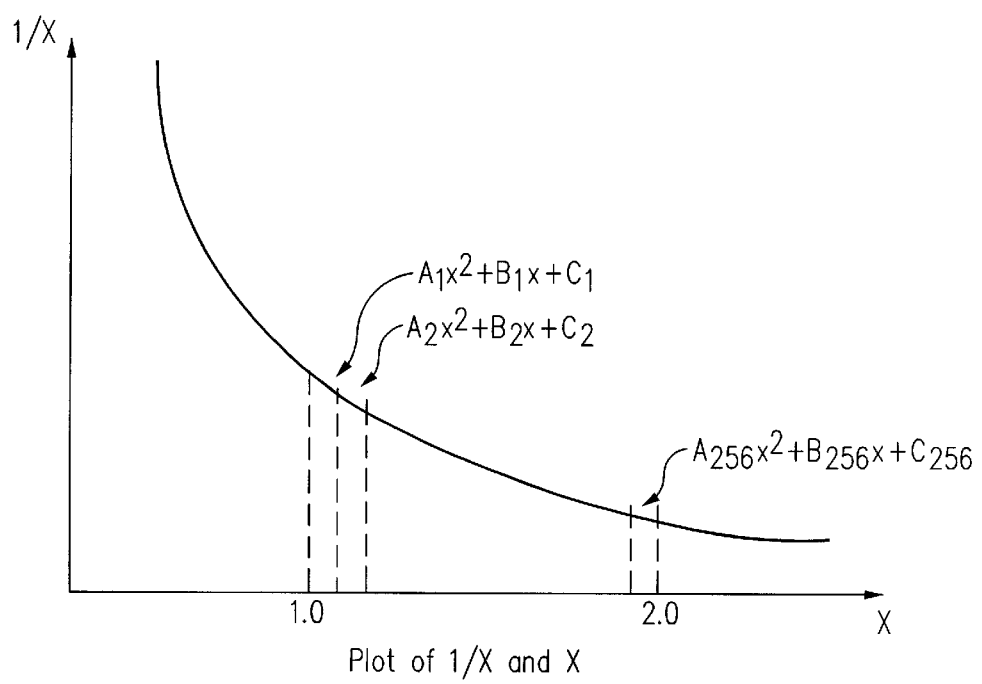
FIGS. 4A and 4B are graphs showing exponential functions that describe a technique utilized to perform a single-precision floating-point division operation.

Referring to FIG. 4A, a graph of an exponential function is shown that describes a technique utilized to perform a single-precision floating-point division operation. The fdiv instruction is implemented using a "piece-wise quadratic approximation to 1/X" operation. The floating point division (Y/X) is executed by calculating the value of the reciprocal term 1/X and then multiplying the resultant value by Y to obtain the division result.

The piece-wise quadratic approximation for computing 1/X uses the equation, as follows:

$$1/X = Ax^2 + Bx + C,$$

where X is defined as a floating point number, the mantissa, and x is the lower-order 15 bits of the mantissa 306. A, B, and C are constant coefficients that are stored in a 256 word ROM. The A, B, and C coordinates are generated using a "generalized-inverse" method for least-squares approximation of 256 equally spaced points within each interval. The ROM lookup table is indexed using the leading 9 bits of the mantissa 306. Since the MSB is always 1, only the next eight bits are used to index to the ROM lookup table.

The coefficients A, B, and C are 11, 18, and 28 bits wide, respectively. The coefficients have sufficient precision to give a final result for single-precision accuracy. Since x has eight leading zeros, the MSB of $Ax^2$ affects only the $17^{th}$ or lesser significant bits of the approximation. Similarly, the MSB of Bx affects only the $9^{th}$ or lesser significant bits of the approximation. Coefficients are computed to minimize the least mean square error.

A prerounded result for the Y/X division is computed by multiplying the approximated value of 1/X and Y. The result is "rounded" correctly in a later cycle. The rounding mode is a "round to nearest" operation.

Figure 4B:
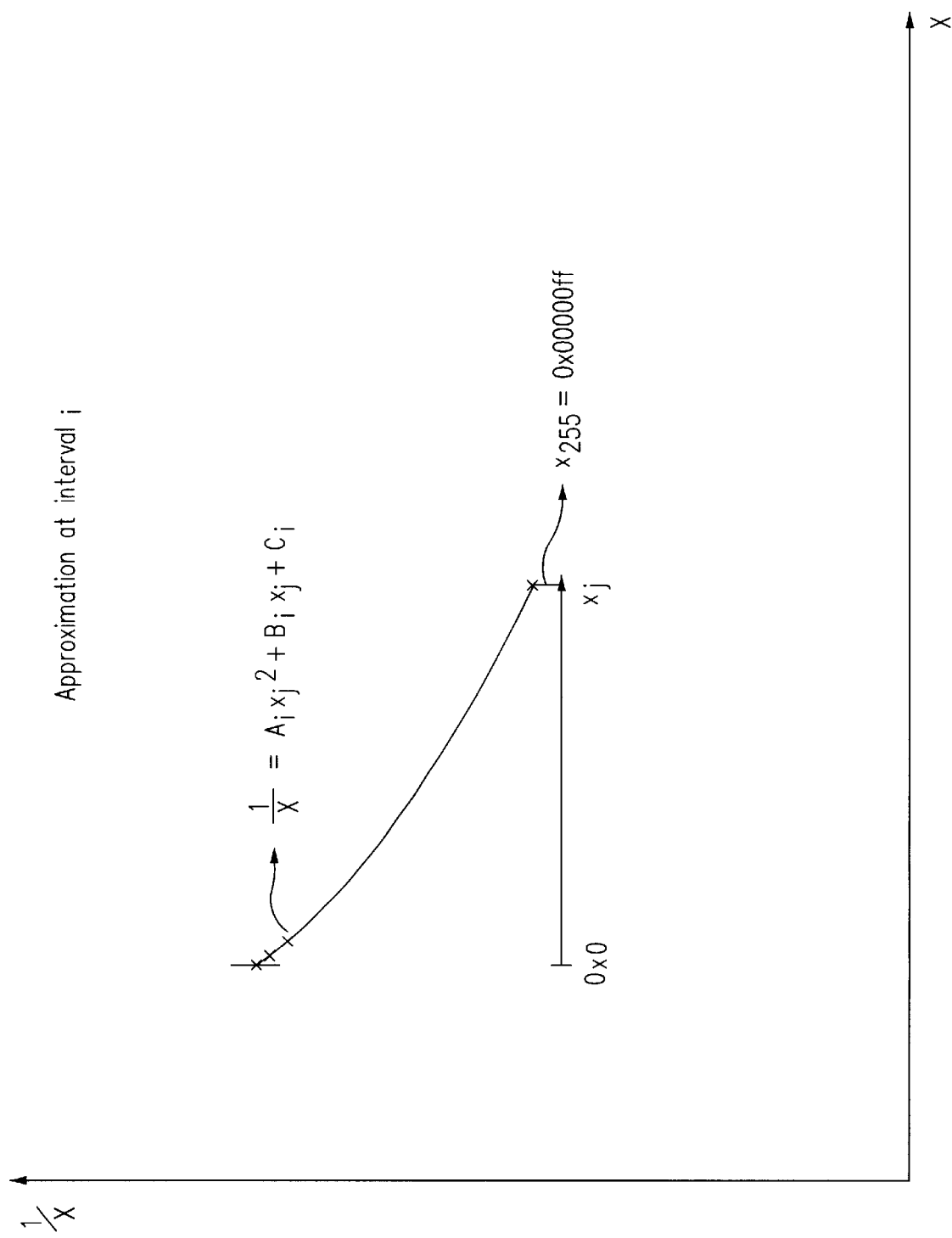

To determine coefficients $A_i$, $B_i$, and $C_i$ for the floating point division function 1/X, for each interval i, where i is an integer from 0 to 255, 256 equally-spaced points are selected. At each of the 256 points, an equation, as follows:

$$1/X = A_i x_j^2 + B_i x_j + C_i,$$

is solved for $x_j$, for a range of integers j from 0 to 255. The values of $X_j$ are the lower-order bits of the mantissa X from $x_0 = 0 \times 0$ to $x_{255} = 0 \times 00000 \text{ff}$, as is shown in FIG. 4B. Solving for $x_j$ produces 256 equations to solve for the coefficients $A_i$, $B_i$, and $C_i$ using a singular-value decomposition method. $A_i$, $B_i$, and $C_i$ are computed for all 256 intervals.

Referring to FIG. 5, a table shows a data flow for the floating point division operation. In a functional unit, a processor, and the like, a control logic such as microcode and a sequencer, or logic circuits, executes the division operation. In the first cycle, the value of $x^2$ is calculated and the coefficients A, B, and C are accessed from the ROM lookup table. The result of the 16-bit by 16-bit multiplication is in the final binary form. In the second cycle, coefficient A is multiplied by $x^2$ and the coefficient B is multiplied by x. The Bx result is in a carry-save format. In the third cycle, the value 1/X is approximated by adding the values $Ax^2$, Bx, and C using the 28-bit adder.

In the fourth cycle, a prerounded result of Y/X is determined with the result in a carry-save format. In the fifth cycle, the division result is rounded by precalculating the prerounded value. In the sixth cycle, a suitable rounded value is selected.

The sign of the result is obtained by performing an exclusive-OR operation on the sign of the value X and the value Y. The exponent of the result is computed by subtracting the exponent of X from the exponent of Y. The exponent of the result may have to be decremented by one if the mantissa of Y is less than the mantissa of X. The bias of the exponents is taken into account while subtracting the exponent.

Referring to FIG. 6, a table shows different cases for rounding to the nearest even scheme. The rounding operation takes a number regarded as infinitely precise and modifies the number to fit the format of the destination. The IEEE standard for binary floating point arithmetic defines four possible rounding schemes: round to the nearest, round towards +infinity, round towards −infinity, and round to 0. The most difficult rounding scheme to implement is round to nearest. In the round to nearest mode, the representable value nearest to the infinitely precise result is delivered and if the two nearest representable values are equally near, the result with a least significant bit of zero is delivered. The described round to nearest technique attains the smallest error and therefore produces a best numerical result. However, the described round to nearest mode utilizes an extra addition and the carry may propagate fully across the number. FIG. 6 shows different cases of rounding.

The result obtained by a multiplication of the approximation of 1/X and Y (for example, a value $Z^1$) may have an error of 1 in the least significant bit. To determine a correct result (for example, Z) and perform a correct rounding, the following operations are performed. First the precision of $Z^1$ is increased by one bit. A value 1 is then added to the next least significant bit, increasing the value to 25 bits. Then the remainder is computed via the equation, as follows:

$$Rem=Z^{1}*(X-Y).$$

If the remainder is positive, the originally-approximated value is correct. If the remainder is negative, another half is added to $Z^1$ to attain a correct result. If the remainder is zero, one-half is either added or subtracted, depending on the value of the LSB. Thus referring again to FIG. 5, to compute the correct result in the case of rounding to the nearest value, $Q^1$ is truncated at the round bit position and incremented at the round bit position ($Q^{11}$) in cycle 5.

In cycle 6, the incremented quotient $Q^{11}$ is then within a least-significant bit (LSB) of the correct solution. The incremented quotient multiplied by the divisor is compared with the dividend by subtraction. If the remainder is negative, the quotient $Q^1$ is more than half an LSB below the correct value, and is thus incremented. If the remainder is positive, the quotient $Q^1$ is less than half below the correct answer, and the quotient is not to be incremented. If the remainder is equal to zero, the final value is selected based on the LSB of $Q^1$. To compute the correct result in the case of other rounding modes, the quotient is merely incremented or truncated depending on the operation code.

Pseudocode that describes an example of a suitable technique for rounding to the nearest number is, as follows:

$Q^{11}=Q^1<<I+1$;
Remainder=$(Q^{11}*D)$−Dividend;
IF (Remainder<0) THEN Quotient=$Q^1$+1;
ELSE IF (Remainder>0) THEN Quotient=$Q^1$;
ELSE IF ((Remainder=0) & LSB of $Q^1$=0));
THEN Quotient=$Q^1$;
ELSE IF ((Remainder=0) & LSB of $Q^1$=1));
THEN Quotient=$Q^1$+1.

Figure 7:
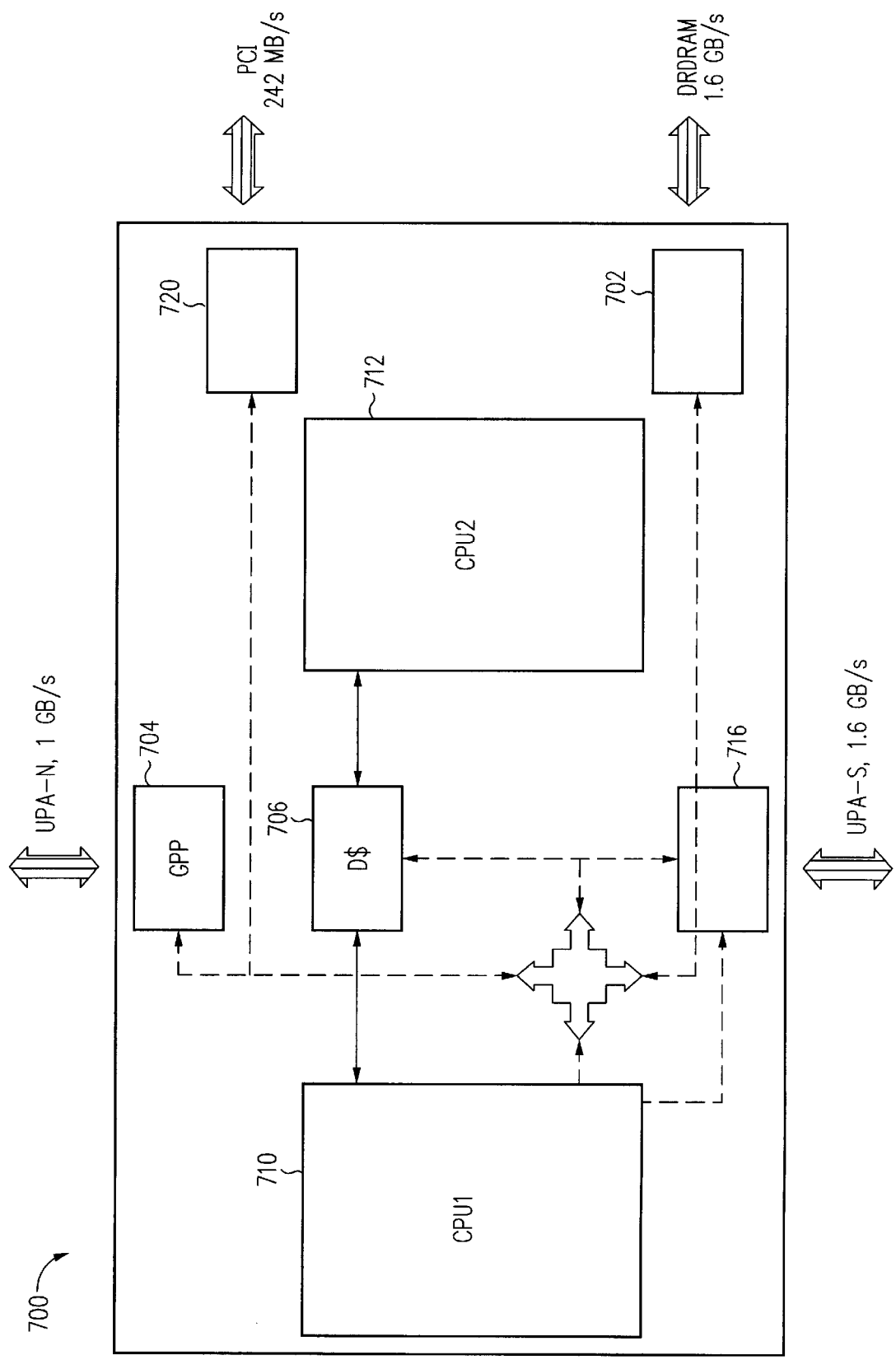
FIG. 7 is a schematic block diagram illustrating a single integrated circuit chip implementation of a processor in accordance with an embodiment of the present invention.

Referring to FIG. 7, a schematic block diagram illustrates a single integrated circuit chip implementation of a processor 700 that includes a memory interface 702, a geometry decompressor 704, two media processing units 710 and 712, a shared data cache 706, and several interface controllers. The interface controllers support an interactive graphics environment with real-time constraints by integrating fundamental components of memory, graphics, and input/output bridge functionality on a single die. The components are mutually linked and closely linked to the processor core with high bandwidth, low-latency communication channels to manage multiple high-bandwidth data streams efficiently and with a low response time. The interface controllers include a an UltraPort Architecture Interconnect (UPA) controller 716 and a peripheral component interconnect (PCI) controller 720. The illustrative memory interface 702 is a direct Rambus dynamic RAM (DRDRAM) controller. The shared data cache 706 is a dual-ported storage that is shared among the media processing units 710 and 712 with one port allocated to each media processing unit. The data cache 706 is four-way set associative, follows a write-back protocol, and supports hits in the fill buffer (not shown). The data cache 706 allows fast data sharing and eliminates the need for a complex, error-prone cache coherency protocol between the media processing units 710 and 712.

The UPA controller 716 is a custom interface that attains a suitable balance between high-performance computational and graphic subsystems. The UPA is a cache-coherent, processor-memory interconnect. The UPA attains several advantageous characteristics including a scaleable bandwidth through support of multiple bused interconnects for data and addresses, packets that are switched for improved bus utilization, higher bandwidth, and precise interrupt processing. The UPA performs low latency memory accesses with high throughput paths to memory. The UPA includes a buffered cross-bar memory interface for increased bandwidth and improved scalability. The UPA supports high-performance graphics with two-cycle single-word writes on the 64-bit UPA interconnect. The UPA interconnect architecture utilizes point-to-point packet switched messages from a centralized system controller to maintain cache coherence. Packet switching improves bus bandwidth utilization by removing the latencies commonly associated with transaction-based designs.

The PCI controller 720 is used as the primary system I/O interface for connecting standard, high-volume, low-cost peripheral devices, although other standard interfaces may also be used. The PCI bus effectively transfers data among high bandwidth peripherals and low bandwidth peripherals, such as CD-ROM players, DVD players, and digital cameras.

Two media processing units 710 and 712 are included in a single integrated circuit chip to support an execution environment exploiting thread level parallelism in which two independent threads can execute simultaneously. The threads may arise from any sources such as the same application, different applications, the operating system, or the runtime environment. Parallelism is exploited at the thread level since parallelism is rare beyond four, or even two, instructions per cycle in general purpose code. For example, the illustrative processor 700 is an eight-wide machine with eight execution units for executing instructions. A typical "general-purpose" processing code has an instruction level parallelism of about two so that, on average, most (about six) of the eight execution units would be idle at any time. The illustrative processor 700 employs thread level parallelism and operates on two independent threads, possibly attaining twice the performance of a processor having the same resources and clock rate but utilizing traditional non-thread parallelism.

Thread level parallelism is particularly useful for Java™ applications which are bound to have multiple threads of execution. Java™ methods including "suspend", "resume", "sleep", and the like include effective support for threaded program code. In addition, Java™ class libraries are thread-safe to promote parallelism. Furthermore, the thread model of the processor 700 supports a dynamic compiler which runs as a separate thread using one media processing unit 710 while the second media processing unit 712 is used by the current application. In the illustrative system, the compiler applies optimizations based on "on-the-fly" profile feedback information while dynamically modifying the executing code to improve execution on each subsequent run. For example, a "garbage collector" may be executed on a first media processing unit 710, copying objects or gathering pointer information, while the application is executing on the other media processing unit 712.

Although the processor 700 shown in FIG. 7 includes two processing units on an integrated circuit chip, the architecture is highly scaleable so that one to several closely-coupled processors may be formed in a message-based coherent architecture and resident on the same die to process multiple threads of execution. Thus, in the processor 700, a limitation on the number of processors formed on a single die thus arises from capacity constraints of integrated circuit technology rather than from architectural constraints relating to the interactions and interconnections between processors.

Figure 8:
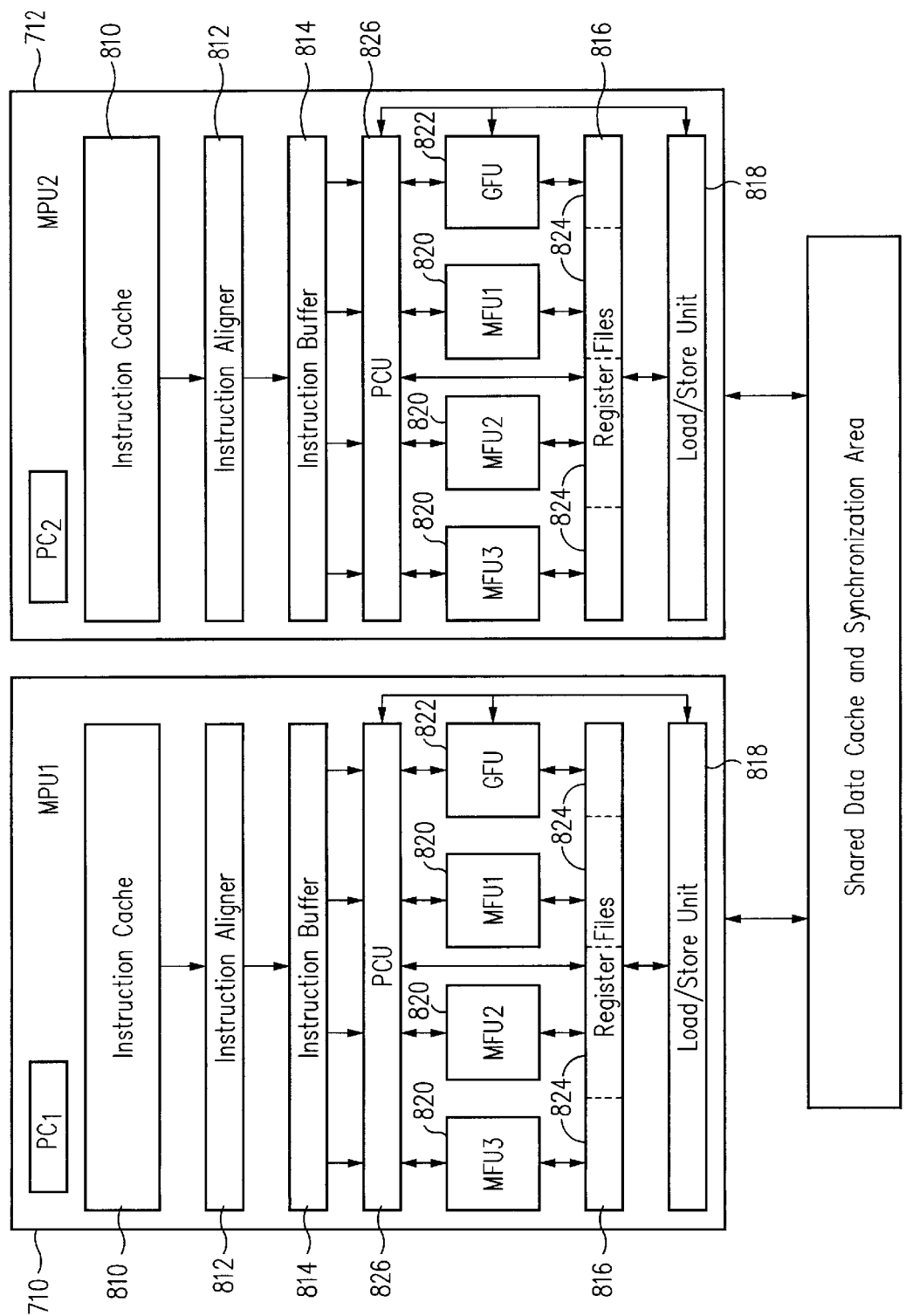
FIG. 8 is a schematic block diagram showing the core of the processor.

Referring to FIG. 8, a schematic block diagram shows the core of the processor 700. The media processing units 710 and 712 each include an instruction cache 810, an instruction aligner 812, an instruction buffer 814, a pipeline control unit 826, a split register file 816, a plurality of execution units, and a load/store unit 818. In the illustrative processor 700, the media processing units 710 and 712 use a plurality of execution units for executing instructions. The execution units for a media processing unit 710 include three media functional units (MFU) 820 and one general functional unit (GFU) 822. The media functional units 820 are multiple single-instruction-multiple-datapath (MSIMD) media functional units. Each of the media functional units 820 is capable of processing parallel 16-bit components. Various parallel 16-bit operations supply the single-instruction-multiple-datapath capability for the processor 700 including add, multiply-add, shift, compare, and the like. The media functional units 820 operate in combination as tightly-coupled digital signal processors (DSPs). Each media functional unit 820 has an separate and individual sub-instruction stream, but all three media functional units 820 execute synchronously so that the subinstructions progress lock-step through pipeline stages.

The general functional unit 822 is a RISC processor capable of executing arithmetic logic unit (ALU) operations, loads and stores, branches, and various specialized and esoteric functions such as parallel power operations, reciprocal square root operations, and many others. The general functional unit 822 supports less common parallel operations such as the parallel reciprocal square root instruction.

The illustrative instruction cache 810 has a 16 Kbyte capacity and includes hardware support to maintain coherence, allowing dynamic optimizations through self-modifying code. Software is used to indicate that the instruction storage is being modified when modifications occur. The 16K capacity is suitable for performing graphic loops, other multimedia tasks or processes, and general-purpose Java™ code. Coherency is maintained by hardware that supports write-through, non-allocating caching. Self-modifying code is supported through explicit use of "store-to-instruction-space" store2i. Software uses the store2i instruction to maintain coherency with the instruction cache 810 so that the instruction caches 810 do not have to be snooped on every single store operation issued by the media processing unit 710.

The pipeline control unit 826 is connected between the instruction buffer 814 and the functional units and schedules the transfer of instructions to the functional units. The pipeline control unit 826 also receives status signals from the functional units and the load/store unit 818 and uses the status signals to perform several control functions. The pipeline control unit 826 maintains a scoreboard, generates stalls and bypass controls. The pipeline control unit 826 also generates traps and maintains special registers.

Each media processing unit 710 and 712 includes a split register file 816, a single logical register file including 128 thirty-two bit registers. The split register file 816 is split into a plurality of register file segments 824 to form a multi-ported structure that is replicated to reduce the integrated circuit die area and to reduce access time. A separate register file segment 824 is allocated to each of the media functional units 820 and the general functional unit 822. In the illustrative embodiment, each register file segment 824 has 128 32-bit registers. The first 96 registers (0–95) in the register file segment 824 are global registers. All functional units can write to the 96 global registers. The global registers are coherent across all functional units (MFU and GFU) so that any write operation to a global register by any functional unit is broadcast to all register file segments 824. Registers 96–127 in the register file segments 824 are local registers. Local registers allocated to a functional unit are not accessible or "visible" to other functional units.

The media processing units 710 and 712 are highly structured computation blocks that execute software-scheduled data computation operations with fixed, deterministic and relatively short instruction latencies, operational characteristics yielding simplification in both function and cycle time. The operational characteristics support multiple instruction issue through a pragmatic very large instruction word (VLIW) approach that avoids hardware interlocks to account for software that does not schedule operations properly. Such hardware interlocks are typically complex, error-prone, and create multiple critical paths. A VLIW instruction word always includes one instruction that executes in the general functional unit (GFU) 822 and from zero to three instructions that execute in the media functional units (MFU) 820. A MFU instruction field within the VLIW instruction word includes an operation code (opcode) field, three source register (or immediate) fields, and one destination register field.

Instructions are executed in-order in the processor 700 but loads can finish out-of-order with respect to other instructions and with respect to other loads, allowing loads to be moved up in the instruction stream so that data can be streamed from main memory. The execution model eliminates the usage and overhead resources of an instruction window, reservation stations, a re-order buffer, or other blocks for handling instruction ordering. Elimination of the instruction ordering structures and overhead resources is highly advantageous since the eliminated blocks typically consume a large portion of an integrated circuit die. For example, the eliminated blocks consume about 30% of the die area of a Pentium II processor.

To avoid software scheduling errors, the media processing units 710 and 712 are high-performance but simplified with respect to both compilation and execution. The media processing units 710 and 712 are most generally classified as a simple 2-scalar execution engine with full bypassing and hardware interlocks on load operations. The instructions include loads, stores, arithmetic and logic (ALU) instructions, and branch instructions so that scheduling for the processor 700 is essentially equivalent to scheduling for a simple 2-scalar execution engine for each of the two media processing units 710 and 712.

The processor 700 supports full bypasses between the first two execution units within the media processing unit 710 and 712 and has a scoreboard in the general functional unit 822 for load operations so that the compiler does not need to handle nondeterministic latencies due to cache misses. The processor 700 scoreboards long latency operations that are executed in the general functional unit 822, for example a reciprocal square-root operation, to simplify scheduling across execution units. The scoreboard (not shown) operates by tracking a record of an instruction packet or group from the time the instruction enters a functional unit until the instruction is finished and the result becomes available. A VLIW instruction packet contains one GFU instruction and from zero to three MFU instructions. The source and destination registers of all instructions in an incoming VLIW instruction packet are checked against the scoreboard. Any true dependencies or output dependencies stall the entire packet until the result is ready. Use of a scoreboarded result as an operand causes instruction issue to stall for a sufficient number of cycles to allow the result to become available. If the referencing instruction that provokes the stall executes on the general functional unit 822 or the first media functional unit 820, then the stall only endures until the result is available for intra-unit bypass. For the case of a load instruction that hits in the data cache 106, the stall may last only one cycle. If the referencing instruction is on the second or third media functional units 820, then the stall endures until the result reaches the writeback stage in the pipeline where the result is bypassed in transmission to the split register file 816.

The scoreboard automatically manages load delays that occur during a load hit. In an illustrative embodiment, all loads enter the scoreboard to simplify software scheduling and eliminate NOPs in the instruction stream.

The scoreboard is used to manage most interlocks between the general functional unit 822 and the media functional units 820. All loads and non-pipelined long-latency operations of the general functional unit 822 are scoreboarded. The long-latency operations include division idiv,fdiv instructions, reciprocal square root frecsqrt, precsqrt instructions, and power ppower instructions. None of the results of the media functional units 820 is scoreboarded. Non-scoreboarded results are available to subsequent operations on the functional unit that produces the results following the latency of the instruction.

The illustrative processor 700 has a rendering rate of over fifty million triangles per second without accounting for operating system overhead. Therefore, data feeding specifications of the processor 700 are far beyond the capabilities of cost-effective memory systems. Sufficient data bandwidth is achieved by rendering of compressed geometry using the geometry decompressor 104, an on-chip real-time geometry decompression engine. Data geometry is stored in main memory in a compressed format. At render time, the data geometry is fetched and decompressed in real-time on the integrated circuit of the processor 700. The geometry decompressor 104 advantageously saves memory space and memory transfer bandwidth. The compressed geometry uses an optimized generalized mesh structure that explicitly calls out most shared vertices between triangles, allowing the processor 700 to transform and light most vertices only once. In a typical compressed mesh, the triangle throughput of the transform-and-light stage is increased by a factor of four or more over the throughput for isolated triangles. For example, during processing of triangles, multiple vertices are operated upon in parallel so that the utilization rate of resources is high, achieving effective spatial software pipelining. Thus operations are overlapped in time by operating on several vertices simultaneously, rather than overlapping several loop iterations in time. For other types of applications with high instruction level parallelism, high trip count loops are software-pipelined so that most media functional units 820 are fully utilized.

Figure 9:
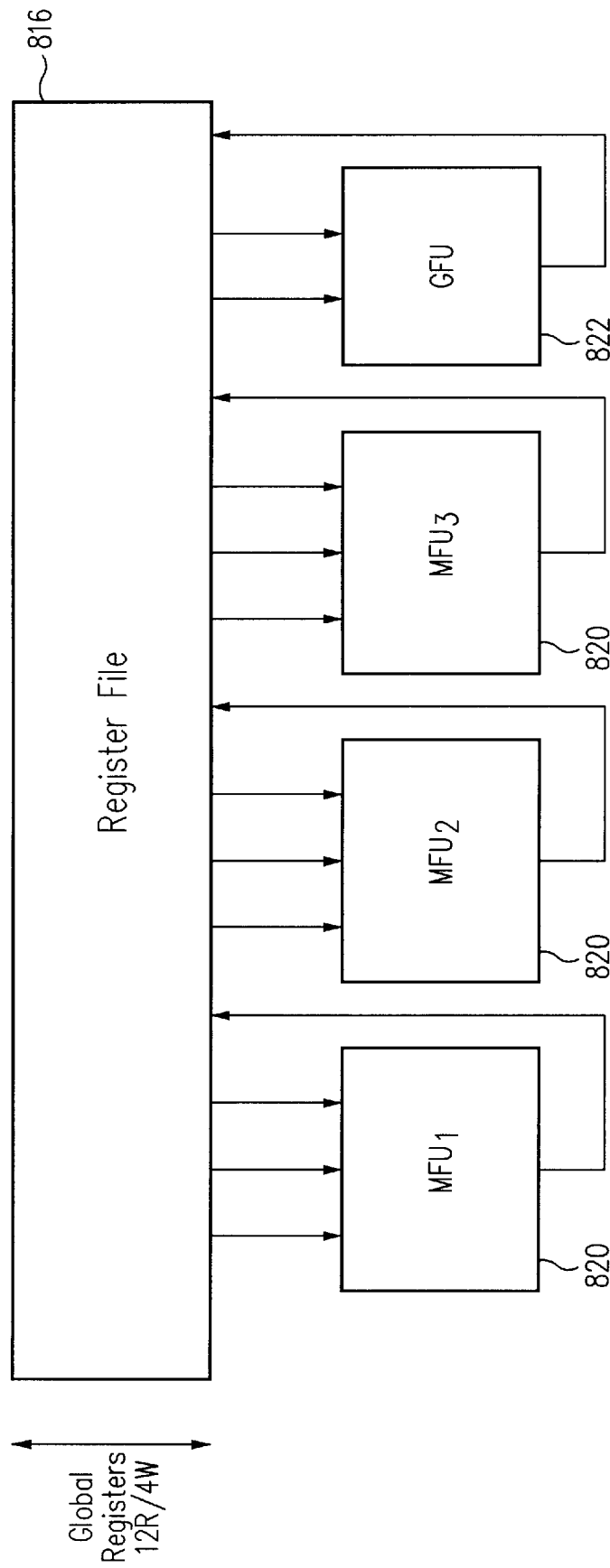
FIG. 9 is a schematic block diagram that shows a logical view of the register file and functional units in the processor.

Referring to FIG. 9, a schematic block diagram shows a logical view of the register file 816 and functional units in the processor 700. The physical implementation of the core processor 700 is simplified by replicating a single functional unit to form the three media processing units 710. The media processing units 710 include circuits that execute various arithmetic and logical operations including general-purpose code, graphics code, and video-image-speech (VIS) processing. VIS processing includes video processing, image processing, digital signal processing (DSP) loops, speech processing, and voice recognition algorithms, for example.

A media processing unit 710 includes a 32-bit floating-point multiplier-adder to perform signal transform operations, clipping, facedness operations, sorting, triangle set-up operations, and the like. The media processing unit 710 similarly includes a 16×16-bit integer multiplier-adder for perform operations such as lighting, transform normal lighting, computation and normalization of vertex view vectors, and specular light source operations. The media processing unit 710 supports clipping operations and 1/square root operations for lighting tasks, and reciprocal operations for screen space dividing, clipping, set-up, and the like. For VIS operations, the media processing unit 710 supports 16/32-bit integer add operations, 16×16-bit integer multiplication operations, parallel shifting, and pack, unpack, and merge operations. For general-purpose code, the media processing unit 710 supports 32-bit integer addition and subtraction, and 32-bit shift operations. The media processing unit 710 supports a group load operation for unit stride code, a bit extract operation for alignment and multimedia functionality, a pdist operation for data compression and averaging, and a byte shuffle operation for multimedia functionality.

The media processing unit 710 supports the operations by combining functionality and forming a plurality of media functional units 820 and a general functional unit 822. The media functional units 820 support a 32-bit floating-point multiply and add operation, a 16×16-bit integer multiplication and addition operation, and a 8/16/32-bit parallel add operation. The media functional units 820 also support a clip operation, a bit extract operation, a pdist operation, and a byte shuffle operation. Other functional units that are in some way incompatible with the media functional unit 820 or consume too much die area for a replicated structure, are included in the general functional unit 822. The general functional unit 822 therefore includes a load/store unit, a reciprocal unit, a 1/square root unit, a pack, unpack and merge unit, a normal and parallel shifter, and a 32-bit adder.

Computation instructions perform the real work of the processor 700 while load and store instructions may considered mere overhead for supplying and storing computational data to and from the computational functional units. To reduce the number of load and store instructions in proportion to the number of computation instructions, the processor 700 supports group load (ldg) and store long (stl) instructions. A single load group loads eight consecutive 32-bit words into the split register file 816. A single store long sends the contents of two 32-bit registers to a next level of memory hierarchy. The group load and store long instructions are used to transfer data among the media processing units 710, the UPA controller 716, and the geometry decompressor 704.

Figure 10:
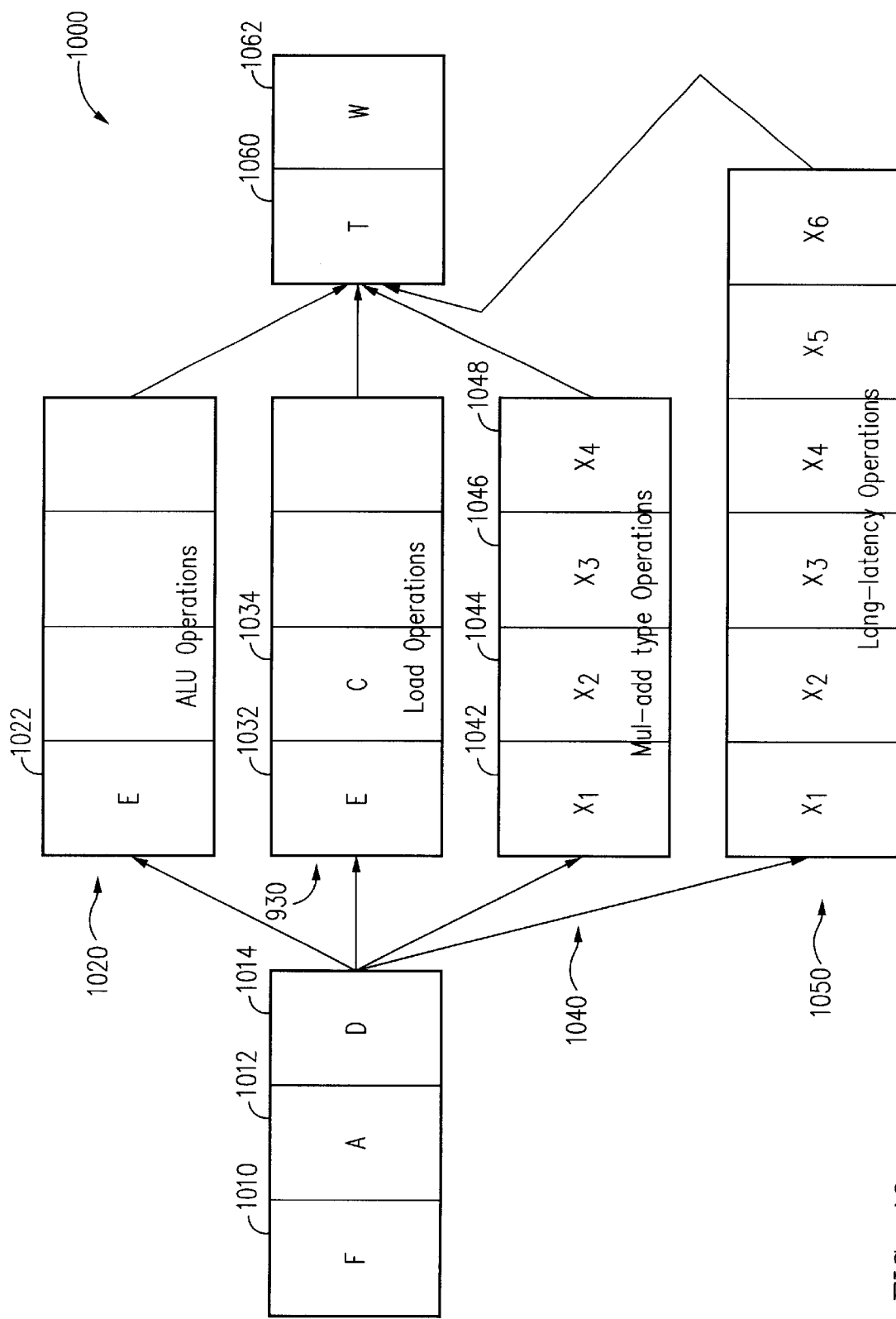
FIG. 10 is a schematic timing diagram that illustrates timing of the processor pipeline.

Referring to FIG. 10, a simplified schematic timing diagram illustrates timing of the processor pipeline 7000. The pipeline 7000 includes nine stages including three initiating stages, a plurality of execution phases, and two terminating stages. The three initiating stages are optimized to include only those operations necessary for decoding instructions so that jump and call instructions, which are pervasive in the Java™ language, execute quickly. Optimization of the initiating stages advantageously facilitates branch prediction since branches, jumps, and calls execute quickly and do not introduce many bubbles.

The first of the initiating stages is a fetch stage 1010 during which the processor 700 fetches instructions from the 16Kbyte two-way set-associative instruction cache 810. The fetched instructions are aligned in the instruction aligner 812 and forwarded to the instruction buffer 814 in an align stage 1012, a second stage of the initiating stages. The aligning operation properly positions the instructions for storage in a particular segment of the four register file segments and for execution in an associated functional unit of the three media functional units 820 and one general functional unit 822. In a third stage, a decoding stage 1014 of the initiating stages, the fetched and aligned VLIW instruction packet is decoded and the scoreboard (not shown) is read and updated in parallel. The four register file segments each holds either floating-point data or integer data.

Following the decoding stage 1014, the execution stages are performed. The particular stages that are performed within the execution stages vary depending on the particular instruction to be executed. A single execution stage 1022 is performed for critical single-cycle operations 1020 such as, add, logical, compare, and clip instructions. Address-cycle type operations 1030, such as load instructions, are executed in two execution cycles including an address computation stage 1032 followed by a single-cycle cache access 1034. General arithmetic operations 1040, such as floating-point and integer multiply and addition instructions, are executed in four stages $X_1$ 1042, $X_2$ 1044, $X_3$ 1046, and $X_4$ 1048. Extended operations 1050 are long instructions such as floating-point divides, reciprocal square roots, 16-bit fixed-point calculations, 32-bit floating-point calculations, and parallel power instructions, that last for six cycles, but are not pipelined.

The two terminating stages include a trap-handling stage 1060 and a write-back stage 1062 during which result data is written-back to the split register file 816.

Computational instructions have fundamental importance in defining the architecture and the instruction set of the processor 700. Computational instructions are only semantically separated into integer and floating-point categories since the categories operate on the same set of registers.

The general functional unit 822 executes a fixed-point power computation instructionppower. The power instruction has the formppower r[rs1],r[rs2],r[rd] and computes "r[rs1]**r[rs2]" where each of the sources is operated upon as a pair of independent 16-bit S2.13 format fixed-point quantities. The result is a pair of 5independent 16-bit S2.13 format fixed-point powers placed in the register r[rd]. Zero to any power is defined to give a zero result.

The general functional unit 822 includes functional units that execute a floating-point divisionfdiv instruction, a floating-point reciprocalfrecip instruction, a floating-point square rootfsqrt instruction, and a floating-point reciprocal square root frecsqrt instruction, each for single-precision numbers. The floating-point division instruction has the formfdiv rs1,rs2,rd and computes a single-precision floating-point division "r[rs1]/r[rs2]" and delivers the result in r[rd]. The floating-point reciprocal instruction has the formfrecip rs1,rd and executes a single-precision floating-point reciprocal with a latency of eight cycles. The floating-point square root instruction has the formfsqrt rs1,rd and executes a single-precision floating-point square root operation. The floating-point reciprocal square root instruction has the form frecsqrt rs1,rd and executes a single-precision floating-point reciprocal of the square root operation on the quantity in r[rs1] and places the result in r[rd].

The general functional unit 822 also supports a fixed-point parallel reciprocal square root precsqrt instruction. The fixed-point reciprocal square root instruction has the form precsqrt rs1,rd. Precsqrt computes a pair of S2.13 format fixed-point reciprocal square roots of the pair of S2.13 format values on register r[rs1]. Results are delivered in register r[rd]. The result for a source operand that is less than or equal to zero is undefined.

The general functional unit 822 executes an integer divide idiv instruction that computes either "r[rs1]/r[rs2]" or "r[rs1]/sign_ext(imm14)" and places the result in r[rd].

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

What is claimed is:

1. A method of computing a floating point division operation y/x for floating point operands y and x in a computing device comprising: approximating a value $1/x = Ax^2+Bx+C$ using a piecewise quadratic approximation of a number x and using stored coefficients A, B, and C, the number x having a mantissa and an exponent, the computing operation comprising:

accessing the A, B, and C coefficients from a storage; and computing the value $Ax^2+Bx+C$ without rounding to produce a result, the result having a mantissa and an exponent;

multiplying the approximated value 1/x times the operand y comprising:

multiplying the computed value $Ax^2+Bx+C$ times the operand y as a multiplier to generate a pre-rounded result; and rounding the pre-rounded result to the nearest value.

2. A method according to claim 1 the action of rounding the pre-rounded result further comprising:

rounding the pre-rounded result to produce a result consistent with IEEE-754 specification including:

selecting a round bit position;

truncating the pre-rounded result at the round bit position;

incrementing the truncated pre-rounded result;

multiplying the incremented and truncated pre-rounded result times the number x to generate a rounding test result;

comparing the pre-rounded result to the rounding test result;

if the rounding test result is larger, incrementing the pre-rounded to determine a rounded result;

if the pre-rounded result is larger, setting the value of the rounded result equal to the pre-rounded result value; and if the pre-rounded result is equal to the rounding test result, setting the rounded result value according to the LSB of the pre-rounded result value.

3. A method according to claim 1 further comprising:

precedent to storing the coefficients A, B, and C, deriving the coefficients A, B, and C to reduce least mean square error using a least squares approximation of a plurality of equally-spaced points within an interval.

4. A method according to claim 1 wherein:

the number x is a floating point number in which the value x designates the mantissa and the number x designates lower order bits of the floating point number x.

5. A method according to claim 1 further comprising:

accessing the A, B, and C coefficients from a storage including:

indexing the storage using higher order bits of the mantissa.

6. A method according to claim 1 further comprising:

accessing the A, B, and C coefficients from a storage including:

indexing the storage using higher order bits of the mantissa excluding the most significant bit.

7. An integrated circuit including:

a multiplier;

an adder coupled to the multiplier; and a control logic coupled to the multiplier and the adder, the control logic comprising an executable instruction sequence that is capable of executing a method of computing a floating point division operation y/x for floating point operands y and x in a computing device comprising:

approximating a value $1/x=Ax^2+Bx+C$ using a piecewise quadratic approximation of a number x and using stored coefficients A, B, and C, the number x having a mantissa and an exponent, the computing operation comprising:

accessing the A, B, and C coefficients from a storage; and computing the value $Ax^2+Bx+C$ without rounding to produce a result, the result having a mantissa and an exponent;

multiplying the approximated value 1/x times the operand y comprising:

multiplying the computed value $Ax^2+Bx+C$ times the operand y as a multiplier to generate a pre-rounded result; and rounding the pre-rounded result to the nearest value.

8. An integrated circuit according to claim 7 further comprising:

a processor comprising:

an instruction storage;

a register file coupled to the instruction storage;

a functional unit including:

the multiplier;

the adder coupled to the multiplier; and the control logic coupled to the multiplier and the adder.

9. A method of computing a floating point division operation y/x for floating point operands y and x in a computing device comprising:

approximating a value $1/x=Ax^2+Bx+C$ using a piecewise quadratic approximation of a number x and using stored coefficients A, B, and C, the number x having a mantissa and an exponent, the computing operation comprising:

computing the value $Ax^2+Bx+C$ without rounding to produce a result, the result having a mantissa and an exponent, including:

accessing the A, B, and C coefficients from a storage;

squaring the operand x to obtain an $x^2$ term;

multiplying the $x^2$ term times the coefficient A to obtain an $Ax^2$ term;

multiplying the x term times the coefficient B to obtain a Bx term; and summing the $Ax^2$ term, the Bx term, and the C term to form a reciprocal term 1/x;

multiplying the reciprocal term 1/x by the operand y to determine a pre-rounded result; and rounding the pre-rounded result to the nearest value.

10. A method according to claim 9 the action of rounding the pre-rounded result further comprising:

rounding the pre-rounded result to produce a result consistent with IEEE-754 specification including:

selecting a round bit position;

truncating the pre-rounded result at the round bit position;

incrementing the truncated pre-rounded result;

multiplying the incremented and truncated pre-rounded result times the multiplier y to generate a rounding test result;

comparing the pre-rounded result to the rounding test result;

if the rounding test result is larger, incrementing the pre-rounded to determine a rounded result;

if the pre-rounded result is larger, setting the value of the rounded result equal to the pre-rounded result value; and if the pre-rounded result is equal to the rounding test result, setting the rounded result value according to the LSB of the pre-rounded result value.

11. A method according to claim 10 further comprising:

truncating the pre-rounded result at the round bit position and incrementing the truncated pre-rounded result in a single clock cycle.

12. A method according to claim 9 further comprising:
accessing the A, B, and C coefficients from a storage and squaring the operand to obtain an $x^2$ term in a single clock cycle.

13. A method according to claim 9 further comprising:
multiplying the $x^2$ term times the coefficient A to obtain an $Ax^2$ term and multiplying the operand x times the coefficient B to obtain a Bx term in a single clock cycle.

14. A method according to claim 9 further comprising:
summing the $Ax^2$ term, the Bx term, and the C term to form an approximation result and shifting the exponent right in a single clock cycle.

15. A method according to claim 9 further comprising:
precedent to storing the coefficients A, B, and C, deriving the coefficients A, B, and C to reduce least mean square error using a least squares approximation of a plurality of equally-spaced points within an interval.

16. An integrated circuit including:

a multiplier;

an adder coupled to the multiplier; and a control logic coupled to the multiplier and the adder, the control logic comprising an executable instruction sequence that is capable of executing a method of computing a floating point division operation y/x for floating point operands y and x in a computing device comprising:
  approximating a value $1/x = Ax^2+Bx+C$ using a piece-wise quadratic approximation of a number x and using stored coefficients A, B, and C, the number x having a mantissa and an exponent, the computing operation comprising:
    computing the value $Ax^2+Bx+C$ without rounding to produce a result, the result having a mantissa and an exponent, including:
      accessing the A, B, and C coefficients from a storage;
      squaring the operand x to obtain an $x^2$ term;
      multiplying the $x^2$ term times the coefficient A to obtain an $Ax^2$ term;
      multiplying the x term times the coefficient B to obtain a Bx term; and
      summing the $Ax^2$ term, the Bx term, and the C term to form a reciprocal term 1/x;
    multiplying the reciprocal term 1/x by the operand y to determine a pre-rounded result; and
    rounding the pre-rounded result to the nearest value.

17. An integrated circuit according to claim 16 further comprising:
a processor comprising:
  an instruction storage;
  a register file coupled to the instruction storage;
  a functional unit including:
    the multiplier;
    the adder coupled to the multiplier; and
    the control logic coupled to the multiplier and the adder.

18. An integrated circuit including:

a storage;

a first multiplier and a second multiplier coupled to the storage;

an adder coupled to the storage, the first multiplier, and the second multiplier;

a control logic coupled to the storage, the first multiplier, the second multiplier, and the adder, the control logic that is capable of executing an action that approximates a value $1/x = Ax^2+Bx+C$ using a piece-wise quadratic approximation of an operand x and using stored coefficients A, B, and C, the operand x having a mantissa and an exponent in a plurality of parallel data paths, the control logic being capable of executing a method comprising:
  computing the value $Ax^2+Bx+C$ without rounding to produce a result, the result having a mantissa and an exponent, including:
    accessing the A, B, and C coefficients from a storage;
    squaring the operand x to obtain an $x^2$ term;
    multiplying the $x^2$ term times the coefficient A to obtain an $Ax^2$ term;
    multiplying the x term times the coefficient B to obtain a Bx term; and
    summing the $Ax^2$ term, the Bx term, and the C term to form a reciprocal term 1/x.

19. An integrated circuit according to claim 18 wherein:
the first multiplier is a 16-bit by 16-bit multiplier;
the second multiplier is a 25×24 multiplier; and
the adder is a 28-bit adder.

20. An integrated circuit according to claim 18 wherein the control logic further comprises:
a control logic that is capable of computing a floating point division operation y/x for floating point operands y and x including:
  multiplying the reciprocal term 1/x by a multiplier y to determine a pre-rounded result; and
  rounding the pre-rounded result to the nearest value.

* * * * *